(12) United States Patent
Arashitani et al.

(10) Patent No.: US 7,555,183 B2
(45) Date of Patent: Jun. 30, 2009

(54) OPTICAL FIBER RIBBON CORE AND OPTICAL FIBER CABLE

(75) Inventors: Yoshihiro Arashitani, Tokyo (JP); Toshiaki Ozawa, Tokyo (JP); Kunihiko Yujoubou, Tokyo (JP); Zoltan Varallyay, Budapest (HU)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/911,967

(22) PCT Filed: Mar. 29, 2007

(86) PCT No.: PCT/JP2007/057619

§ 371 (c)(1),
(2), (4) Date: Oct. 19, 2007

(87) PCT Pub. No.: WO2007/114486

PCT Pub. Date: Oct. 11, 2007

(65) Prior Publication Data
US 2008/0181565 A1 Jul. 31, 2008

(30) Foreign Application Priority Data
Mar. 31, 2006 (JP) ............................. 2006-099452

(51) Int. Cl.
*G02B 6/44* (2006.01)
*G02B 6/00* (2006.01)
(52) U.S. Cl. .................... 385/114; 385/100; 385/144
(58) Field of Classification Search ................ 385/114, 385/100, 144
See application file for complete search history.

(56) References Cited

U.S. PATENT DOCUMENTS 5,298,047 A 3/1994 Hart, Jr. et al.
(Continued)

FOREIGN PATENT DOCUMENTS

JP 6-171970 6/1994
(Continued)

OTHER PUBLICATIONS

U.S. Appl. No. 11/911,967, filed Oct. 19, 2007, Arashitani, et al.
(Continued)

*Primary Examiner*—Frank G Font
*Assistant Examiner*—Jerry Blevins
(74) *Attorney, Agent, or Firm*—Oblon, Spivak, McClelland, Maier & Neustadt, P.C.

(57) ABSTRACT

There are provided an optical fiber ribbon and optical fiber cable which suppress the deterioration of polarization mode dispersion and contribute to the increase of communication capacity in wavelength division multiplexing. An optical fiber ribbon includes a plurality of optical fibers 12 tied in a bundle and a ribbon coating layer 13 formed around the plurality of optical fibers to integrate the plurality of optical fibers, wherein the glass-transition temperature of the coating ranges from 80° C. to 130° C. and "a" is 0.01 mm² or less, where "a" is a sectional area of the ribbon coating layer 13 in a cross section in which outer half of the optical fiber at an edge of the ribbon and the coating of the optical fiber ribbon are taken along a line passing the center of the glass optical fiber positioned at one of edges of the ribbon out of the plurality of the optical fibers and being perpendicular to the horizontal plane of the optical fiber ribbon.

6 Claims, 3 Drawing Sheets

U.S. PATENT DOCUMENTS

| | | |
|---|---|---|
| 5,822,487 A | 10/1998 | Evans et al. |
| 6,057,034 A | 5/2000 | Yamazaki et al. |
| 6,076,376 A | 6/2000 | Onishi et al. |
| 6,334,016 B1 * | 12/2001 | Greer, IV .................... 385/114 |
| 7,151,879 B2 | 12/2006 | Ishikawa et al. |
| 2004/0146255 A1 * | 7/2004 | Ishikawa et al. ............ 385/114 |

FOREIGN PATENT DOCUMENTS

| | | |
|---|---|---|
| JP | 8-295528 | 11/1996 |
| JP | 11-011986 | 1/1999 |
| JP | 2001-042184 | 2/2001 |
| JP | 2004-354889 | 12/2004 |
| JP | 2005-141143 | 6/2005 |
| JP | 2005-165363 | 6/2005 |
| JP | 2005-222080 | 8/2005 |
| JP | 2006-053346 | 2/2006 |

OTHER PUBLICATIONS

U.S. Appl. No. 12/024,606, filed Feb. 1, 2008, Arashitani, et al.

Andrea Galtarossa, et al., "Stress Distribution in Optical-Fiber Ribbons", IEEE Photonics Technology Letters, vol. 9, No. 3, Mar. 1997, pp. 354-356.

Andrea Galtarossa, et al., "Effects of Fiber Displacements on Stress Distribution in 8-Fiber Ribbons", ECOC, vol. 97, 22-25 Conference Publication No. 448, Sep. 1997, pp. 123-126.

* cited by examiner

OPTICAL FIBER RIBBON CORE AND OPTICAL FIBER CABLE

TECHNICAL FIELD

The present invention relates to an optical fiber ribbon and an optical fiber cable.

BACKGROUND ART

An optical communication technique has been required to strictly control a dispersion characteristic for meeting a demand of increasing communication capacity primarily needed for a wavelength division multiplexing in recent years. For this reason, an optical fiber cable has also been required to control a polarization dispersion characteristic.

An optical fiber ideally needs to be completely round in cross section, however, the cross section of the optical fiber substantially includes all sorts of asymmetry such as deviation from a complete round and eccentricity of the circle. The non-circularity of the optical fiber results from production facilities and production conditions, so that the non-circularity tends to continue in the longitudinal direction as well as in a cross section of the optical fiber. The propagation of light through the optical fiber with non-circularity produces a difference in propagation velocity between the X and Y polarization mode being the propagation mode of the light to cause dispersion. This is known as a polarization mode dispersion (PMD).

For the polarization mode dispersion of an optical fiber, the following Patent Documents have proposed an optical fiber and a method of producing the same in which an optical fiber preform is guided by a guide roller periodically swinging at the time of drawing an optical fiber matrix to impart a predetermined torsion to the optical fiber to preclude non-circularity inherent in the cross section of the optical fiber from continuing in the longitudinal direction to equalize the X polarization mode with the Y polarization mode in propagation velocity, thereby reducing the polarization mode dispersion (refer to Patent Document 1, Japanese Patent Application Laid-Open No. H06-171970; Patent Document 2, Japanese Patent Application Laid-Open No. H08-295528; and Patent Document 3, U.S. Pat. No. 5,822,487).

A typical optical fiber ribbon includes a plurality of optical fibers arranged in parallel and a ribbon resin for coating the optical fibers. The optical fiber includes a glass fiber made of silica glass, primary coating layer and secondary coating layer. The structure of the optical fiber ribbon is such that a plurality of optical fibers are arranged in parallel and integrated with the optical fibers contacted or not contacted with one another and collectively covered with a ribbon coating layer.

The optical fiber ribbon is thus structured to form a structural characteristic in which a stress exerting on each optical fiber is different according to a position where each optical fiber is arranged because the optical fiber ribbon is asymmetric in cross section in the thickness and width direction. That is to say, in the optical fiber ribbon formed such that a plurality of optical fibers are arranged in parallel and the periphery thereof is integrated with a coating, each optical fiber is subjected to stress from the coating formed at the production process of the optical fiber ribbon at a position where each optical fiber is arranged, so that an optical fiber arranged on an inner side the ribbon is different in strength and direction of stress exerted thereon from one arranged on an outer side of the ribbon.

An asymmetry in the cross section of the optical fiber ribbon continuing in the longitudinal direction and a different stress exerted on each optical fiber widen a difference in the polarization mode dispersion resulting from the stress between the optical fibers, which tends to deteriorate the polarization mode dispersion in the optical fiber ribbon and the optical fiber cable aggregating the optical fiber ribbons.

In contrast to the foregoing structure, an attempt has been made in a Non-Patent Document 1 in which a stress exerted on the glass fiber is estimated from the ribbon resin of the optical fiber ribbon and a primary and a secondary coating layer provided on the periphery of the glass fiber, and double refraction of each optical fiber is estimated based on obtained stress (refer to Non-Patent Document 1, "Stress Distribution in Optical-Fiber Ribbons," A. Galtarossa et al., IEEE Photonics Technology Letters, Vol. 9, No. 3, March 1997; Non-Patent Document 2, "Effect of Fiber Displacements on Stress Distribution in 8-Fiber Ribbons," A. Galtarossa et al., ECOC 97, 22-25 Conference Publication No. 448).

According to the above studies, it is reported that double refraction estimated based on estimated stress values well agrees with the tendency in the polarization mode dispersion exhibited by each optical fiber inside the optical fiber ribbon including a plurality of the optical fibers, which shows that a stress inherent in the coating layer for the optical fiber and the coating for the optical fiber ribbon is intimately associated with the polarization mode dispersion.

DISCLOSURE OF THE INVENTION

The present invention has for its purpose to provide an optical fiber ribbon and optical fiber cable suppressing deterioration in the polarization mode dispersion and increasing capacity in wavelength division multiplexing.

According to an aspect of the invention, an optical fiber ribbon characterized by comprising a plurality of optical fibers tied in a bundle each including a glass optical fiber and a coating layer provided on the periphery of a clad of the glass optical fiber and a coating formed around the plurality of optical fibers to integrate the plurality of optical fibers, wherein the glass-transition temperature of the coating ranges from 80° C. to 130° C. and "a" is $0.01 \text{ mm}^2$ or less, where "a" is a sectional area of the coating in a cross section in which outer half of the optical fiber at an edge of the ribbon and the coating of the optical fiber ribbon are taken along a line passing the center of the glass optical fiber positioned at one of edges of the ribbon out of the plurality of the optical fibers and being perpendicular to the horizontal plane of the optical fiber ribbon.

According to the present invention, the optical fiber ribbon and optical fiber cable have a sufficient toughness and can suppress the polarization mode dispersion low while maintaining a separation ability into individual fibers and coating strip ability.

BEST MODES FOR CARRYING OUT THE INVENTION

Figure 1:
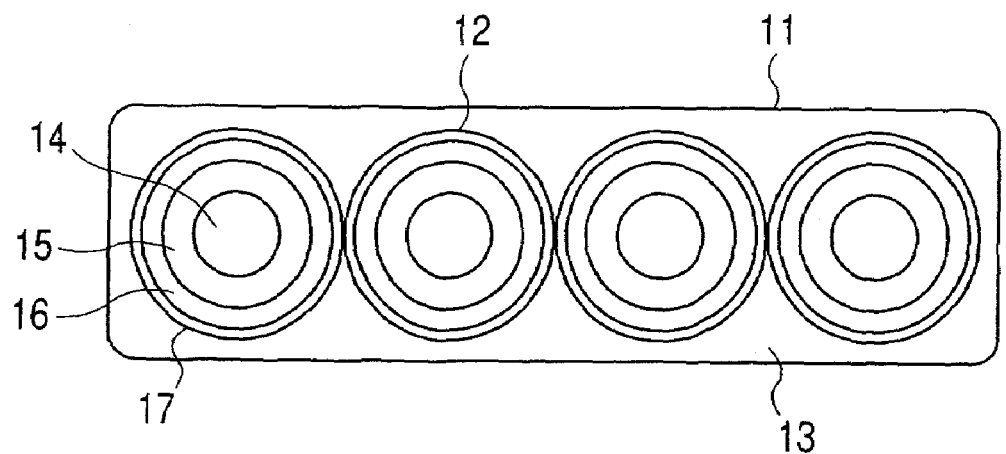
FIG. 1 is a cross section illustrating one embodiment of an optical fiber ribbon according to one embodiment of the present invention.

The embodiment of the present invention is described with reference to the drawings. One embodiment of the optical fiber ribbon according to the present invention has a cross sectional structure illustrating in FIG. 1. As illustrated in FIG. 1, an optical fiber ribbon 11 includes an optical fiber 12 and ribbon resin 13. The optical fiber includes glass fiber 14 made of silica glass, a primary coating layer 15 and a secondary coating layer 16. The structure of the optical fiber ribbon 11 is such that a plurality of optical fibers 12 are arranged in parallel and integrated with the optical fibers 12 contacted or not contacted with one another and collectively covered with the ribbon coating layer 13. Incidentally, FIG. 1 illustrates the optical fiber ribbon in which four optical fibers 12 are contacted with one another.

Figure 2:
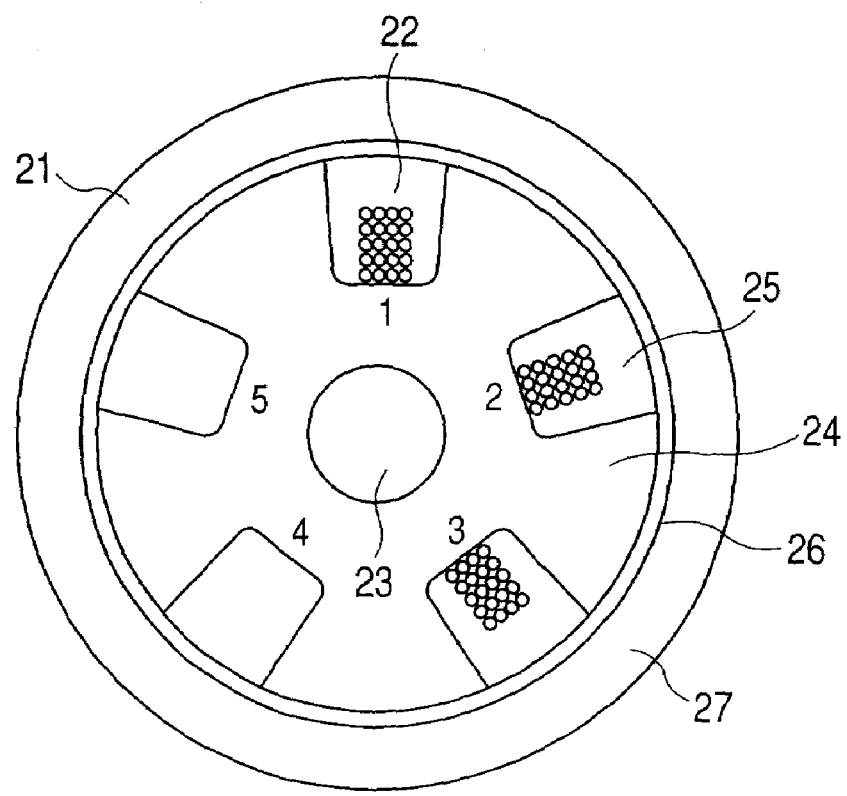
FIG. 2 is a cross section illustrating one example of an optical fiber cable produced by aggregating optical fiber ribbons 22.

An optical fiber cable 21 is produced by aggregating a plurality of optical fiber ribbons 11 illustrated in FIG. 1. FIG. 2 is a cross section of one example of an optical fiber cable produced by aggregating the optical fiber ribbons 22. The optical fiber cable 21 includes the optical fiber ribbons 22, tension member 23, slot 24, groove 25, press winding 26 and sheath 27. An aggregation of a plurality of optical fiber ribbons 22 is disposed on spiral or screw-driving trench 25 engraved on the slot 24.

The optical fiber ribbon 11 uses an ultraviolet hardening resin as the coating 13 for the periphery of four optical fibers 12 arranged in parallel. Thermoplastic resin or thermosetting resin may be used as the ribbon resin 13 in stead of the ultraviolet hardening resin.

If the ultraviolet hardening resin is used as the ribbon resin 13 for integrally coating the periphery of the optical fibers 12 arranged in parallel, the ribbon resin 13 is liquid at the initial stage of the production process. The optical fibers arranged in parallel are coated with liquid ribbon resin, caused to pass through a die with a predetermined size and hardened by an ultraviolet lamp, thereby producing the optical fiber ribbon 11 with a predetermined shape and size.

The resin is increased in temperature by its own heat of reaction at the hardening process of the ribbon resin 13 by an ultraviolet lamp and hardened while expanding in volume. After hardening has finished, the ribbon resin 13 is gradually in equilibrium with room temperature and contracts in volume of the ribbon resin 13 at the process to exert a contraction stress on the optical fibers 12. The stress is constant in each cross section of the optical fiber ribbon 11 and fixed in the longitudinal direction, so that a difference in propagation velocity between the X and Y polarization mode generated in each cross section of the optical fiber ribbons 11 is stored without randomizing in the longitudinal direction to increase the polarization mode dispersion of the optical fiber ribbon 11.

The present inventors paid attention to the fact that a contraction stress exerted on the optical fiber 12 by the ribbon resin 13 increased the polarization mode dispersion and made exhaustive investigations. As a result, the inventors have found that the use of a resin with a glass-transition temperature of 80° C. to 130° C. as the ribbon resin 13 can suppress the contraction stress and provide an optical fiber ribbon both with toughness and separation ability into individual fibers required for the optical fiber ribbon 11.

That is to say, a temperature at which the ribbon resin is hardened in a process reaches one hundred and several tens degrees C., so that the maximum temperature will exceed the glass-transition temperature of the ribbon resin. A resin material containing ultraviolet hardening resin is in a rubbery state in a temperature range higher than the glass-transition temperature, and the expansion/contraction rate of the volume accompanied by change in temperature is higher by three times than that in a temperature range lower than the glass-transition temperature in a glass state. For this reason, a resin material high in the glass-transition temperature is in a rubbery state for a shorter period during which a contraction rate is higher in a process in which the optical fiber ribbon increases in temperature to one hundred and several tens degrees C. to complete hardening and then cooled to a room temperature, so that the resin material is smaller in contraction amount than a resin material low in the glass-transition temperature. From the above standpoints, the resin material high in the glass-transition temperature is desirable as the ribbon resin material for suppressing the contraction stress of the ribbon resin 13 low and reducing the polarization mode dispersion.

However, the glass-transition temperature of a resin is somewhat associated with hardness and toughness of the resin. Excessively high glass-transition temperature makes the ribbon resin hard and brittle to break a ribbon resin layer by a weak external force, which may make it difficult to maintain the shape of the optical fiber ribbon. The hard and brittle resin is not desirable for the purpose of satisfying the coating strip ability and separation ability into individual fibers because the resin layer tends to be easily broken to make it difficult to collectively strip the ribbon resin layer. On the other hand, a resin material low in the glass-transition temperature and Young's modulus of the ribbon resin is comparatively higher in viscosity of the ribbon resin, which causes a problem in that a coloring layer is peeled at the time of separation into individual fibers or it is difficult to strip the ribbon resin. From these viewpoints, a resin suitable for a ribbon resin material for reducing the polarization mode dispersion is desirably 80° C. to 130° C. in the glass-transition temperature and more desirably 90° C. to 120° C. In consideration of toughness, coating strip ability and separation ability into individual fibers required for the ribbon resin material, the glass-transition temperature of the ribbon resin material falls within the above range and Young's modulus thereof desirably falls within 800 MPa to 2,500 MPa and more desirably within 1,000 MPa to 2,300 MPa. Furthermore, the equilibrium modulus of the ribbon resin material desirably falls within 40 MPa to 70 MPa.

As one example of the above ultraviolet hardening resin, there is included photopolymerizable prepolymer, photopolymerizable monomer and photopolymerizable initiator. The photopolymerizable prepolymer includes urethane acrylate-based resin, epoxy acrylate resin, polyol acrylate resin, butadiene acrylate resin, polyester acrylate-based resin and silicon acrylate-based resin. The photopolymerizable monomer includes vinylpyrrolidone, hydroxyethyl acrylate and ethylhexyl acrylate. The photopolymerizable initiator includes benzophenone-based compound, acylphosphine oxide-based compound and acetophenone-based compound.

When the compound of the above ultraviolet hardening resin is prescribed, Young's modulus or glass-transition temperature can be controlled to some extent to a prescribed value by changing mutual solubility and compounding ratio of photopolymerizable monomer to photopolymerizable prepolymer, compounding polyfunctional photopolymerizable monomer and blending a plurality of photopolymerizable prepolymers different in polymerization degree (molecular weight). For example, Japanese Patent Application Laid-Open No. 2004-354889 discloses a method of increasing Young's modulus by increasing the amount of compound of two functional monomers such as ethyleneoxide modified bisphenol A diacrylate. Japanese Patent Application Laid-Open No. H11-011986 discloses a method of controlling Young's modulus and glass-transition temperature by changing blending ratio of polyurethane oligomer different in mean molecular weight.

Although the above is a description on the case where the ultraviolet hardening resin is applied, an action by which contraction stress is caused in the ribbon resin 13 is the same as is the case where thermoplastic resin or thermosetting resin is used. The glass-transition temperature required for the ribbon resin material desirably falls within the same range.

The present inventors found that "a" was desirably 0.01 $mm^2$ or less and more desirably was 0.006 $mm^2$ or less, wherein "a" is a sectional area of a ribbon coating layer 13 of the optical fiber ribbon in a cross section in which outer half of the optical fiber at an edge of the ribbon and the ribbon coating layer 13 of the optical fiber ribbon were taken along a line 18 passing the center of the glass optical fiber positioned at one of edges of the ribbon out of a plurality of the optical fibers 12 in the above optical fiber ribbon 11 and the line 18 being perpendicular to the horizontal plane of the optical fiber ribbon 11.

As described in Non-Patent Documents 1 and 2, the glass optical fibers in the optical fiber ribbon are influenced by stress inherent in the optical fiber coating layer (the primary coating layer 15 and the secondary coating layer 16) and the coating (the ribbon resin 13) of the optical fiber ribbon and have respective polarization mode dispersion characteristics. It has been described above that the tendency in the polarization mode dispersion can be estimated from double refraction estimated from the stress. In the studies in the Non-Patent Documents 1 and 2, the estimated stress is multiplied by a certain photoelastic coefficient to perform conversion into double refraction. The tendency in an estimated stress value in the optical fibers substantially coincides with the tendency in the polarization mode dispersion. The present inventors paid attention to that point and have calculated stress inherent in the cross sections of the optical fiber ribbons with various sizes by using the method of the Non-Patent Documents 1 and 2.

The present inventors confirmed that the polarization mode dispersion of several actually produced optical fiber ribbons was measured and the average value of polarization mode dispersion of the optical fiber ribbons did not exceed 0.2 $ps/km^{1/2}$ when the estimated stress values in the optical fibers did not exceed 0.6 MPa.

The present inventors found that, if the optical fiber ribbon 13 had a characteristic of preferable range according to the present invention, "a" was desirably 0.01 $mm^2$ or less and more desirably was 0.006 $mm^2$ or less, wherein "a" is a sectional area of a ribbon coating layer 13 of the optical fiber ribbon in a cross section in which outer half of the optical fiber at an edge of the ribbon and the ribbon coating layer 13 were taken along a line 18 passing the center of the glass optical fiber positioned at one of edges of the ribbon and being perpendicular to the horizontal plane of the optical fiber ribbon 11.

EXAMPLES

In the present embodiment, a glass fiber 14 with an outer diameter of 125 µm was covered with a protective coating layer formed of two layers of a primary soft coating layer 15 and a secondary hard coating layer 16 made of urethane acrylate-based ultraviolet hardening resin, hardened by ultraviolet rays, further coated with an ultraviolet hardening resin coloring material to form a coloring layer 17, then hardened by ultraviolet rays, thereby producing the optical fiber 12 with an outer diameter of 250 µm. Then, four optical fibers 12 were arranged in parallel and collectively covered with the ribbon resin 13 being urethane acrylate-based ultraviolet hardening resin to produce the optical fiber ribbon 11 with a width of 1.05 mm and a thickness of 0.27 mm.

Table 1 shows results of evaluation of the polarization mode dispersion of the optical fiber ribbons 11 thus produced, separation ability into individual fibers and appearance as well as glass-transition temperature and Young's modulus of the ribbon resin 13. The following describes a method of measuring the characteristics in Table 1.

The polarization mode dispersion of the optical fiber ribbon was measured in such a manner that a 1-km long optical fiber ribbon was coiled with a diameter 30 cm and four optical fibers were measured using the Jones matrix method. The average values of the polarization mode dispersion of the four optical fibers were taken to be the polarization mode dispersion value of the optical fiber ribbon.

The polarization mode dispersion value of the optical fiber ribbon contributing to the increase of communication capacity in wavelength division multiplexing is preferably 0.2 $ps/km^{1/2}$ or less and more preferably 0.1 $ps/km^{1/2}$ or less.

The separation ability into individual fibers was evaluated in such a manner that the ribbon resin 13 was stripped from the optical fiber ribbon 11 by hand at room temperature to determine as to whether the ribbon resin 13 was completely stripped from the optical fiber 12. The optical fiber ribbon to be evaluated is 200 mm in length and the evaluation is made based on appearance and time required at the time of stripping the ribbon resin by a length of 100 mm from the center portion of the ribbon. If the residue of the ribbon resin 13 is left on the optical fiber 12, or coloring peels off, or it is difficult to strip the ribbon resin 13, the evaluation is failed. It is desirable that the ribbon resin 13 can be readily and continuously stripped. For this reason, if the ribbon resin 13 is not continuously stripped or it takes a long time to strip the ribbon resin 13 with a predetermined length, the evaluation is also failed.

The appearance is evaluated in the following manner. The optical fiber ribbon 11 wound onto a drum is wound onto another drum and the dispersion of thickness of the total length is measured by optical sizer at that point. Part where an amplitude showing thickness exceeds 20 µm is viewed to confirm the presence of crack in the ribbon layer. If there is found a crack, the evaluation is failed.

The following is a description of how to measure glass-transition temperature and equilibrium modulus. A dynamic viscoelasticity measuring instrument (model DMS6100 produced by Seiko Instruments Inc.) is used for measuring glass-transition temperature and equilibrium modulus. Dispersion of temperature is measured at a frequency of 1 Hz and in a temperature range of −100° C. to 200° C. A temperature at which Tan delta is maximized is taken to be glass-transition temperature. An elastic modulus (G) at a temperature of 200° C. is taken to be an equilibrium modulus. A piece of the optical fiber ribbon 11 cut by a razor blade is used as a sample for measuring. The sample is 30 mm in length.

Young's modulus is measured in the following manner. A piece of the ribbon resin 13 cut from the optical fiber ribbon 11 by the razor blade is used as a sample. The sample is 40 mm in length. The sample is stretched under the conditions of a gage length of 25 mm and a test speed of 1 mm/min according to the test method specified by Japanese Industrial Standards (JIS) K7113. Secant modulus is calculated from tensile strength at a stretch of 2.5%. Incidentally, the sectional area of the sample is required to calculate the secant modulus. This is obtained in such a manner that the cross section of the sample is observed through an optical microscope at a magnification of 100, captured by a computer and measured using an image analyzing software.

TABLE 1

| | Characteristic of optical fiber ribbon | | | Characteristic of ribbon resin | | |
|---|---|---|---|---|---|---|
| Example of optical fiber ribbon | Polarization mode dispersion ps/km$^{1/2}$ | Separation ability into individual fibers | Appearance | Glass-transition temperature °C. | Young's modulus MPa | Equilibrium modulus MPa |
| 1 | 0.017 | Residue of ribbon resin left on optical fiber | No crack | 129 | 2,514 | 38 |
| 2 | 0.024 | Long time taken to strip ribbon resin | No crack | 125 | 2,520 | 42 |
| 3 | 0.041 | Long time taken to strip ribbon resin | No crack | 121 | 2,340 | 38 |
| 4 | 0.039 | Excellent | No crack | 124 | 988 | 44 |
| 5 | 0.065 | Residue of ribbon resin left on optical fiber | No crack | 127 | 2,205 | 39 |
| 6 | 0.059 | Excellent | No crack | 128 | 2,010 | 43 |
| 7 | 0.186 | Difficulty in stripping ribbon resin | No crack | 90 | 765 | 71 |
| 8 | 0.163 | Difficulty in stripping ribbon resin | Cracked | 98 | 779 | 79 |
| 9 | 0.041 | Residue of ribbon resin left on optical fiber | No crack | 120 | 2,478 | 74 |
| 10 | 0.068 | Slight difficulty in stripping ribbon resin | No crack | 93 | 1,020 | 71 |
| 11 | 0.143 | Excellent | No crack | 112 | 1,245 | 66 |
| 12 | 0.064 | Excellent | No crack | 116 | 1,560 | 54 |
| 13 | 0.178 | Coloring peels off | No crack | 81 | 545 | 83 |
| 14 | 0.188 | Slight difficulty in stripping ribbon resin | No crack | 86 | 745 | 64 |
| 15 | 0.179 | Slight difficulty in stripping ribbon resin | No crack | 82 | 898 | 72 |
| 16 | 0.191 | Excellent | No crack | 88 | 814 | 67 |
| 17 | 0.180 | Slight difficulty in stripping ribbon resin | No crack | 85 | 845 | 74 |
| 18 | 0.159 | Excellent | No crack | 87 | 888 | 66 |
| Comp. Ex. 1 | 0.020 | Residue of ribbon resin left on optical fiber | Cracked | 135 | 2,681 | 48 |
| Comp. Ex. 2 | 0.054 | Residue of ribbon resin left on optical fiber | Cracked | 128 | 2,796 | 52 |

TABLE 1-continued

Characteristic of optical fiber ribbon

| Example of optical fiber ribbon | Characteristic of optical fiber ribbon | | | Characteristic of ribbon resin | | |
|---|---|---|---|---|---|---|
| | Polarization mode dispersion ps/km$^{1/2}$ | Separation ability into individual fibers | Appearance | Glass-transition temperature °C. | Young's modulus MPa | Equilibrium modulus MPa |
| Comp. Ex. 3 | 0.215 | Coloring peels off | No crack | 77 | 645 | 79 |
| Comp. Ex. 4 | 0.264 | Difficulty in stripping ribbon resin | No crack | 69 | 294 | 94 |

The ribbon resins of the optical fiber ribbons in Examples 1 to 18 have a glass-transition temperature ranging from 80° C. to 130° C. As a result of evaluating polarization mode dispersion, all samples were excellent in polarization mode dispersion.

Comparative Examples 1 and 2 are higher in glass-transition temperature than 120° C., which makes the ribbon resin hard and brittle. Consequently, the samples were excellent in polarization mode dispersion, but cracks were observed in appearance.

Comparative Examples 3 and 4 are lower in glass-transition temperature than 80° C. to exceed a polarization mode dispersion of 0.2 ps/km$^{1/2}$.

The optical fiber cables were evaluated which were produced by aggregating the above optical fiber ribbons. The results of evaluation are shown in Table 2.

The optical fiber cables provided for the evaluation were SZ cables each including 100 fibers, that is to say, as illustrated in FIG. 2, the cable has five trenches into which five stacked optical fiber ribbons, each having four fibers, are inserted. The polarization mode dispersion of the above optical fiber cables was evaluated such that a 1-km long optical fiber cable was wound on a 1.0-m diameter drum and measured by the Jones matrix method. The maximum value of polarization mode dispersion of 100 measured optical fibers was taken to be the polarization mode dispersion of the optical fiber cable.

TABLE 2

Characteristic of optical fiber cable

| Example of optical fiber cable | Optical fiber ribbon used | Polarization mode dispersion ps/km$^{1/2}$ | Characteristic of ribbon resin | | |
|---|---|---|---|---|---|
| | | | Glass-transition temperature °C. | Young's modulus MPa | Equilibrium modulus MPa |
| 1 | 1 | 0.059 | 129 | 2514 | 38 |
| 2 | 4 | 0.081 | 124 | 988 | 44 |
| 3 | 8 | 0.168 | 98 | 779 | 79 |
| 4 | 12 | 0.099 | 116 | 1560 | 54 |
| 5 | 18 | 0.185 | 87 | 888 | 66 |
| Comp. Ex. 1 | Comp. Ex. 3 | 0.295 | 77 | 645 | 79 |
| Comp. Ex. 2 | Comp. Ex. 4 | 0.429 | 69 | 294 | 94 |

Examples 1 to 5 were produced by aggregating the optical fiber ribbons suitable for optical fiber cables and all samples were excellent in characteristics.

On the other hand, in Comparative Examples 1 and 2 produced by aggregating the optical fiber ribbons with a polarization mode dispersion above 0.2 ps/km$^{1/2}$, the polarization mode dispersion of the optical fiber cables in the samples exceeded 0.2 ps/km$^{1/2}$.

The present invention is not limited to the present embodiments and other various modifications may be made in the steps undertaken without departing from the sprit and scope thereof. In addition, the present embodiments include various steps of inventions and a plurality of the disclosed constituents is properly combined to provide various inventions.

Even if several constituents are removed from all constituents described in the above embodiments, the problems raised earlier in a passage of "BACKGROUND ART" can be solved and if advantages described in "Advantages of the Invention" can be obtained, configuration deleting the constituents can be extracted as invention.

Stress exerted on the optical fiber 12 was estimated using the methods suggested in Non-Patent Documents 1 and 2. Analyzed results are shown in Table 3.

The samples were prepared such that four optical fibers 12 arranged in parallel were collectively coated with the ribbon resin 13 being urethane acrylate-based ultraviolet hardening resin. A finite element method analyzing software MSC-MARK (produced by MSC Software Corporation) was used for analysis. Prior to the analysis, four kinds of the optical fiber ribbons were selected from among the products and sectional areas were calculated from width, thickness and end configuration of the product design values and used as a model for analysis. The sectional areas were changed as to be an arbitrary value on the analyzing software MSC-MARK. Stress was analyzed for each sectional area.

The analyzing model was a four-fiber optical fiber ribbon. The model of the four-fiber the optical fiber ribbon is bilaterally symmetrical, so that the estimated stress of respective fibers coincides with each other between the left and the right optical fiber located in an edge of the ribbon and at the inner sides. For this reason, Table 3 shows the estimated stress of the optical fiber located in one of edges of the ribbon and one of the inner sides.

TABLE 3

Analysis results of optical fiber ribbon

| Example of optical fiber ribbon | Optical fiber ribbon used | Characteristic of ribbon resin | | | | Estimated stress of outermost fiber MPa | Estimated stress of inner fiber MPa | Polarization mode dispersion ps/km$^{1/2}$ |
|---|---|---|---|---|---|---|---|---|
| | | Glass-transition temperature °C. | Young's modulus MPa | Equilibrium modulus MPa | Sectional area "a" ×10$^{-3}$ mm$^2$ | | | |
| 19 | Ex. 6 | 128 | 2,010 | 39 | 4.1 | 0.43 | 0.10 | 0.065 |
| 20 | | 128 | 2,010 | 39 | 4.7 | 0.20 | 0.23 | |
| 21 | | 128 | 2,010 | 39 | 5.1 | 0.11 | 0.29 | |
| 22 | Ex. 10 | 93 | 1,020 | 71 | 4.1 | 0.44 | 0.08 | 0.068 |
| 23 | | 93 | 1,020 | 71 | 4.7 | 0.28 | 0.24 | |
| 24 | | 93 | 1,020 | 71 | 5.1 | 0.18 | 0.31 | |
| 25 | | 112 | 1,245 | 66 | 4.1 | 0.47 | 0.14 | |
| 26 | | 112 | 1,245 | 66 | 4.7 | 0.38 | 0.28 | |
| 27 | | 112 | 1,245 | 66 | 5.1 | 0.29 | 0.44 | |
| 28 | Ex. 11 | 112 | 1,245 | 66 | 6.1 | 0.20 | 0.53 | 0.143 |
| 29 | | 87 | 888 | 66 | 4.7 | 0.38 | 0.24 | |
| 30 | | 87 | 888 | 66 | 5.1 | 0.27 | 0.46 | |
| 31 | Ex. 18 | 87 | 888 | 66 | 6.1 | 0.18 | 0.56 | 0.159 |
| Comp. Ex. 5 | | 128 | 2,010 | 39 | 12.2 | 0.68 | 0.46 | 0.216 |
| Comp. Ex. 6 | | 112 | 1,245 | 66 | 12.2 | 0.64 | 0.59 | 0.203 |
| Comp. Ex. 7 | | 87 | 888 | 66 | 12.2 | 0.55 | 0.78 | 0.222 |
| Comp. Ex. 8 | Comp. Ex. 3 | 77 | 645 | 79 | 6.1 | 0.52 | 0.81 | 0.215 |
| Comp. Ex. 9 | Comp. Ex. 4 | 69 | 294 | 94 | 6.1 | 0.53 | 0.97 | 0.264 |

In Table 3, numerals filled in the columns of the polarization mode dispersion mean the polarization mode dispersion of actually produced fibers, and slanting lines mean that the polarization mode dispersion of actually produced fibers was not measured but merely stress was estimated.

For the optical fiber ribbons used, shown in Table 3, the Example or Comparative Example numbers thereof are written in the column "the optical fiber ribbons used."

Figure 3:
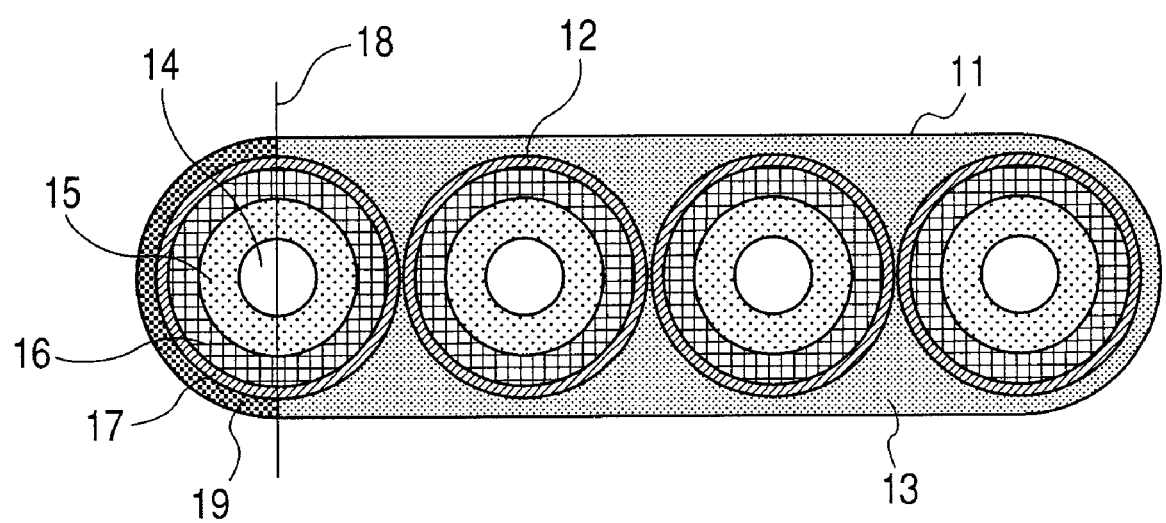
FIG. 3 is a diagram illustrating a sectional area "a"

In the Examples 19 to 31, a sectional area "a" refers to a solid black part 19 of the outermost layer in FIG. 3 ("a" is a sectional area of a ribbon coating layer 13 in a cross section in which outer half of the optical fiber at an edge of the ribbon and the ribbon coating layer 13 of the optical fiber ribbon are taken along a line 18 passing the center of the glass optical fiber positioned at an edge of the ribbon and being perpendicular to horizontal plane of the optical fiber ribbon, in FIG. 3. Other numerals 11 to 17 in FIG. 3 are formed of the same constituent members as those in FIG. 1). The Examples 19 to 31 are 0.01 mm$^2$ or less in sectional area "a." All the estimated stresses thereof were 0.6 MPa or less. All the evaluation results of polarization mode dispersion of the actually produced optical fiber ribbons having a sectional area coinciding with that of the model provided for the analysis were 0.2 ps/km$^{1/2}$ or less and found to be excellent. For a sectional area "a" of 0.006 mm$^2$ or less, all the estimated areas were 0.5 MPa or less and found to be more excellent.

On the other hand, in the Comparative Examples 5 to 7, the ribbon resins of the optical fiber ribbons have a glass-transition temperature ranging from 80° C. to 130° C., however, sectional areas "a" are greater than 0.01 mm$^2$, so that stress values estimated at any one of the outermost or the inner optical fiber are greater than 0.6 MPa and the polarization mode dispersions of these examples are greater than 0.2 ps/km$^{1/2}$.

In the Comparative Examples 8 to 9, sectional areas "a" are 0.01 mm$^2$ or less, however, a glass-transition temperature is lower than 80° C., so that the polarization mode dispersion becomes 0.2 ps/km$^{1/2}$ or more.

Figure 4A:
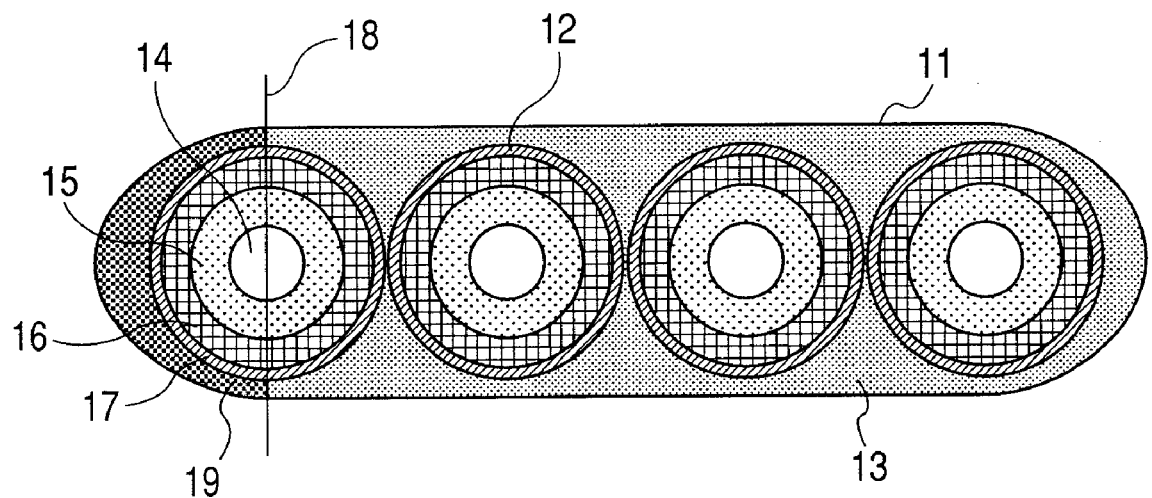
FIG. 4A is a cross section illustrating a sectional area "a" of the optical fiber ribbon according to one embodiment of the present invention.
Figure 4B:
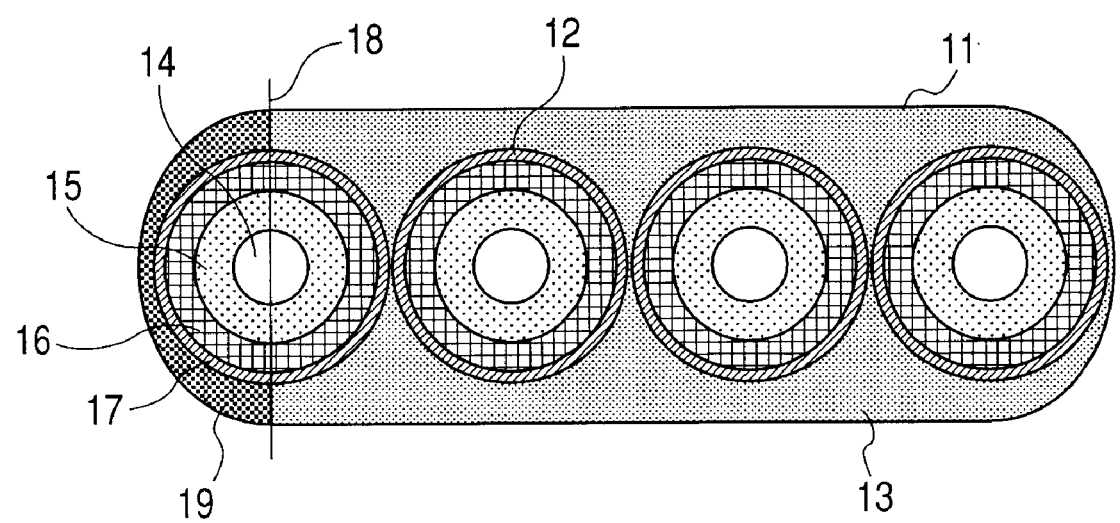
FIG. 4B is a cross section illustrating a sectional area "a" of the optical fiber ribbon according to one embodiment of the present invention.

In the above description, there are various configurations whose sectional areas "a" are equal, a configuration may be vertically symmetrical with respect to a line passing through the center of the glass optical fiber positioned at an edge of the ribbon and parallel to the horizontal plane of the optical fiber ribbon. For example, non-semicircles illustrated in FIGS. 4A and 4B may be used.

This application claims priority from Japanese Patent Application No. 2006-099452 filed Mar. 31, 2006, which are hereby incorporated by reference herein.

The invention claimed is:

1. An optical fiber ribbon characterized by comprising a plurality of optical fibers tied in a bundle each including a glass optical fiber and a coating layer provided on the periphery of the glass optical fiber and a coating formed around the plurality of optical fibers to integrate the plurality of optical fibers, wherein the glass-transition temperature of the coating ranges from 80° C. to 130° C. and "a" is 0.01 mm$^2$ or less, where "a" is a sectional area of the coating in a cross section in which outer half of the optical fiber at an edge of the ribbon and the coating of the optical fiber ribbon are taken along a line passing the center of the glass optical fiber positioned at one of edges of the ribbon out of the plurality of the optical fibers and being perpendicular to the horizontal plane of the optical fiber ribbon, wherein the equilibrium modulus of the coating ranges from 40 MPa to 70 MPa.

2. The optical fiber ribbon according to claim 1, wherein the sectional area "a" is 0.006 mm$^2$ or less.

3. The optical fiber ribbon according to claim 1, wherein the glass-transition temperature of the coating ranges from 90° C. to 120° C.

4. The optical fiber ribbon according to claim 1, wherein the Young's modulus of the coating ranges from 800 MPa to 2,500 MPa.

5. The optical fiber ribbon according to claim 1, wherein the Young's modulus of the coating ranges from 1,000 MPa to 2,300 MPa.

6. An optical fiber cable characterized in that the optical fiber cable is formed by aggregating a plurality of the optical fiber ribbons according to claim 1.

* * * * *